(12) United States Patent
Jacobson et al.

(10) Patent No.: US 7,477,982 B2
(45) Date of Patent: Jan. 13, 2009

(54) EXHAUST GAS RECIRCULATION SYSTEM

(75) Inventors: Evan Jacobson, Peoria, IL (US);
Christopher Gehrke, Chillicothe, IL (US); Brian Tranel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 77 days.

(21) Appl. No.: 11/589,727

(22) Filed: Oct. 31, 2006

(65) Prior Publication Data

US 2008/0103680 A1 May 1, 2008

(51) Int. Cl.
*G06F 17/00* (2006.01)
*F02M 25/07* (2006.01)
*F02B 47/08* (2006.01)

(52) U.S. Cl. .................................. 701/108; 123/568.21

(58) Field of Classification Search ................ 701/103, 701/108, 114; 123/435, 676, 571, 436, 568.11–568.16, 123/568.21; 60/605.1; 73/116, 118.1, 118.2
See application file for complete search history.

(56) References Cited

U.S. PATENT DOCUMENTS

| | | | |
|---|---|---|---|
| 4,164,206 A * | 8/1979 | Toelle .................... | 123/568.27 |
| 5,150,696 A | 9/1992 | Kabasin et al. | |
| 5,508,926 A | 4/1996 | Wade | |
| 5,934,249 A * | 8/1999 | Nanba et al. ................. | 123/350 |
| 6,378,515 B1 | 4/2002 | Geyer | |
| 6,415,776 B1 * | 7/2002 | Gates et al. ............ | 123/568.24 |
| 6,651,492 B2 * | 11/2003 | Kolmanovsky et al. .... | 73/118.2 |
| 6,742,335 B2 | 6/2004 | Beck et al. | |
| 6,837,227 B2 * | 1/2005 | Jaliwala et al. .......... | 123/568.21 |
| 6,935,320 B2 | 8/2005 | Veinotte | |
| 6,944,530 B2 * | 9/2005 | Russell et al. ............... | 701/104 |
| 6,957,642 B2 | 10/2005 | Miura | |
| 6,968,833 B2 * | 11/2005 | Yu et al. ................ | 123/568.16 |
| 6,973,785 B2 * | 12/2005 | Umehara et al. ........... | 60/605.2 |
| 7,076,953 B2 * | 7/2006 | Kreso ........................ | 60/605.2 |
| 7,079,938 B2 * | 7/2006 | Bhargava et al. ............ | 701/108 |
| 7,140,360 B2 * | 11/2006 | Wang et al. .................. | 123/698 |
| 7,171,301 B2 * | 1/2007 | Yu et al. ..................... | 701/114 |
| 7,182,075 B2 * | 2/2007 | Shahed et al. .......... | 123/568.21 |
| 2003/0101724 A1 | 6/2003 | Zurawski et al. | |

FOREIGN PATENT DOCUMENTS

| | | |
|---|---|---|
| DE | 19727385 | 1/1999 |
| EP | 0 820 560 | 6/2002 |
| EP | 1 375 875 | 1/2004 |
| EP | 1726810 | 11/2006 |
| GB | 2 204 915 | 11/1988 |
| WO | 2004027235 | 4/2004 |

\* cited by examiner

*Primary Examiner*—Willis R. Wolfe, Jr.
*Assistant Examiner*—Johnny H. Hoang
(74) *Attorney, Agent, or Firm*—Finnegan, Henderson, Farabow, Garrett & Dunner

(57) ABSTRACT

An exhaust gas recirculation (EGR) system may include an EGR flowpath configured to route a portion of exhaust gases produced by an engine back to an air intake of the engine. The system may include an EGR valve configured to regulate the flow of exhaust gases through the EGR flowpath. In addition, the system may include a flow detection device configured to determine the flowrate of exhaust gases through the EGR flowpath. The system may further include a controller configured to control the EGR valve. In some embodiments, the controller may be configured to control the EGR valve using open-loop control when the flow detection device determines that the EGR flowrate is below a predetermined flowrate and using closed-loop control when the detection device determines that the EGR flowrate is at or above the predetermined flowrate.

20 Claims, 1 Drawing Sheet

EXHAUST GAS RECIRCULATION SYSTEM

TECHNICAL FIELD

The present disclosure is directed to an exhaust gas recirculation (EGR) system and, more particularly to an exhaust gas recirculation system that uses both open-loop and closed-loop control.

BACKGROUND

EGR systems are employed by internal combustion engines to help reduce various engine emissions. A typical EGR system may include a conduit, or other structure, fluidly connecting some portion of the exhaust path of an engine with some portion of the air intake system of the engine to thereby form an EGR path. Different amounts of exhaust gas recirculation may be desirable under different engine operating conditions. In order to regulate the amount of exhaust gas recirculation, such systems typically employ an EGR valve that is disposed at some point in the EGR path.

Systems have been developed to control EGR flow by regulating the amount of exhaust gases that are recirculated under various operating conditions, e.g., by controlling the position of an EGR valve. Some systems include an actuator for opening and closing the EGR valve, wherein the actuator is controlled by software-implemented control logic. Depending on the operating conditions of the engine, the control logic may position the EGR valve to allow varying amounts of exhaust gases to be recirculated.

EGR control systems may utilize closed-loop control or open-loop control. That is, some systems employ a closed-loop control whereby the control system regulates the EGR valve position based on a feedback signal from a device that detects the amount of flow of EGR gases (e.g., a mass flow meter). Such systems may, for example, compare the amount of actual EGR flow indicated by the feedback signal to a desired EGR flow. Such systems may then position the EGR valve to achieve the desired EGR flow. In contrast, open-loop systems do not base control of the EGR valve on detected EGR flow. Rather, such systems may simply operate based on calibrated EGR flowrates vs. EGR valve position.

In many situations, closed-loop control may provide the most accurate control of EGR flow. However, under certain operating conditions, open-loop control may provide a more accurate control of EGR flow. For example, at low flow rates, it may be difficult to accurately detect the actual EGR flowrate. Therefore, neither closed-loop nor open-loop control is optimal for all situations.

Systems have been developed that employ both open-loop control and closed loop control depending on the operating conditions. For example, European Patent Specification EP 0 820 560 B1, issued to Baert et al. ("the '560 document"), discloses a system configured to utilize both open-loop and closed-loop control. However, the system of the '560 document does not distinguish between the type of control at high flowrates and low flowrates. Thus, the system of the '560 document does not solve the above-mentioned difficulty of accurately measuring low EGR flowrates.

The present disclosure is directed at solving one or more of the problems discussed above.

SUMMARY OF THE INVENTION

In one aspect, the present disclosure is directed to an exhaust gas recirculation system. The system may include an exhaust gas recirculation flowpath configured to route a portion of exhaust gases produced by an engine back to an air intake of the engine. The system may also include an exhaust gas recirculation valve configured to regulate the flow of exhaust gases through the exhaust gas recirculation flowpath. In addition, the system may include a flow detection device configured to determine the flowrate of exhaust gases through the exhaust gas recirculation flowpath. The system may further include a controller configured to control the exhaust gas recirculation valve. In some embodiments, the controller may be configured to control the exhaust gas recirculation valve using open-loop control when the flow detection device determines that the exhaust gas recirculation flowrate is below a predetermined flowrate and using closed-loop control when the detection device determines that the exhaust gas recirculation flowrate is at or above the predetermined flowrate.

In another aspect, the present disclosure is directed to a method for exhaust gas recirculation. The method may include routing a portion of exhaust gases produced by an engine back to an air intake of the engine via an exhaust gas recirculation flowpath. The method may also include regulating the flow of exhaust gases through the exhaust gas recirculation flowpath with an exhaust gas recirculation valve. The method may further include determining the flowrate of exhaust gases through the exhaust gas recirculation flowpath with a flow detection device and controlling the exhaust gas recirculation valve with a controller. In addition, the method may include controlling the exhaust gas recirculation valve using open-loop control when the flow detection device determines that the exhaust gas recirculation flowrate is below a predetermined flowrate and using closed-loop control when the detection device determines that the exhaust gas recirculation flowrate is at or above the predetermined flowrate.

DETAILED DESCRIPTION

Figure 1:
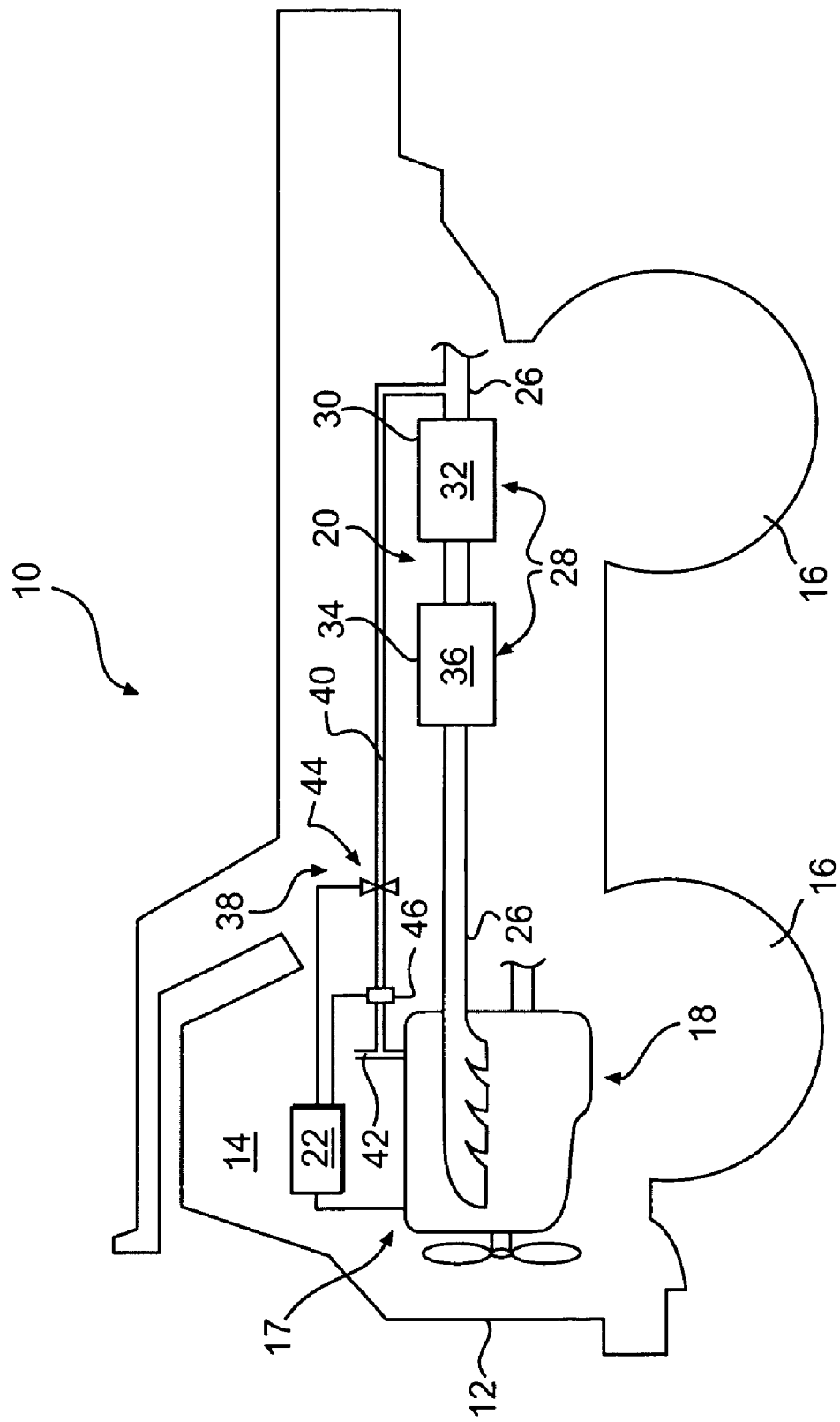
FIG. 1 is a diagrammatic illustration of a machine including an EGR system according to an exemplary disclosed embodiment.

Reference will now be made in detail to exemplary embodiments and the Drawing. While specific configurations and arrangements are discussed, it should be understood that this is done for illustrative purposes only.

FIG. 1 illustrates a machine 10 including a frame 12, an operator station 14, one or more traction devices 16, and a power system 17, which may include an engine 18 and an exhaust system 20. Although machine 10 is shown as a truck, machine 10 could be any type of mobile or stationary machine having an exhaust producing engine. In the case of a mobile machine, traction devices 16 may be any type of traction devices, such as, for example, wheels, as shown in FIG. 1, tracks, belts, or any combinations thereof.

Engine 18 may be attached to frame 12 and may include any kind of engine that produces an exhaust flow of exhaust gases. For example, engine 18 may be an internal combustion engine, such as a gasoline engine, a diesel engine, a gaseous-fuel burning engine or any other exhaust gas producing engine. Engine 18 may be naturally aspirated or, in other embodiments, may utilize forced induction (e.g., turbocharging or supercharging).

Exhaust system 20 may include a controller 22, an exhaust conduit 26, and one or more after-treatment devices 28. These and other components of exhaust system 20 will be discussed in greater detail below.

Controller 22 may include any means for receiving machine operating parameter-related information and/or for monitoring, recording, storing, indexing, processing, and/or communicating such information. These means may include components such as, for example, a memory, one or more data storage devices, a central processing unit, and/or any other components that may be used to run an application.

Although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, and/or other forms of RAM or ROM. Various other known circuits may be associated with controller 22, such as power supply circuitry, signal-conditioning circuitry, solenoid driver circuitry, communication circuitry, and other appropriate circuitry.

Controller 22 may be configured to perform multiple processing and controlling functions, such as, for example, engine management (e.g., controller 22 may include an engine control module, a.k.a. an ECM), monitoring/calculating various parameters related to exhaust output and after-treatment thereof, etc. In some embodiments, machine 10 may include multiple controllers (a configuration not shown), each dedicated to perform one or more of these or other functions. Such multiple controllers may be configured to communicate with one another.

After-treatment devices 28 may include a catalyst-based device 30 (e.g., a catalytic converter). Catalyst-based device 30 may include a catalyst 32 configured to convert (e.g., via oxidation or reduction) one or more gaseous constituents of the exhaust stream produced by engine 18 to a more environmentally friendly gas and/or compound to be discharged into the atmosphere. For example, catalyst 32 may be configured to chemically alter at least one component of the exhaust flow. Catalyst-based device 30 may be configured for one or more various types of conversion, such as, for example, selective catalytic reduction (SCR), diesel oxidation (e.g., a diesel oxidation catalyst, DOC), and/or adsorption of nitrous oxides ($NO_x$; e.g., a $NO_x$ adsorber).

After-treatment devices 28 may also include a particulate trap 34. Particulate trap 34 may include any type of after-treatment device configured to remove one or more types of particulate matter, such as soot and/or ash, from an exhaust flow of engine 18. Particulate trap may include a filter medium 36 configured to trap the particulate matter as the exhaust flows through it. Filter medium 36 may consist of a mesh-like material, a porous ceramic material (e.g., cordierite), or any other material and/or configuration suitable for trapping particulate matter.

In some embodiments, after-treatment devices 28 may include combinations of these types of devices. For example, after-treatment devices 28 may include one or more catalytic particulate traps (not shown), which may include a catalytic material integral with filter medium 36. For example, catalyst 32 may be packaged with, coated on, or otherwise associated with filter medium 36. In some embodiments, filter medium 36 may, itself, be a catalytic material. In addition, although exhaust system 20 is shown with a single catalyst-based device 30 and a single particulate trap 34, exhaust system 20 may include more than one of either or both. In other embodiments, exhaust system 20 may include more than one catalytic particulate trap. Such multiple after-treatment devices may be positioned in series (e.g., along exhaust conduit 26) or in parallel (e.g., in dual exhaust conduits; an embodiment not shown). In some embodiments, catalyst 32 may be positioned downstream from particulate trap 34. In other embodiments, catalyst 32 may be positioned upstream from particulate trap 34. Other embodiments may include catalysts both upstream and downstream from particulate trap 34.

Exhaust system 20 may be configured to route exhaust gases produced by engine 18 away from engine 18 via exhaust conduit 26, which may be configured to direct the exhaust flow from engine 18 to particulate trap 34, to catalyst 32, and ultimately release the exhaust flow to the atmosphere. In addition, exhaust system 20 may include an exhaust gas recirculation system (EGR system) 38.

EGR system 38 may include an exhaust gas recirculation flowpath (EGR flowpath) 40 configured to route a portion of exhaust gases produced by engine 18 back to an air intake 42 of engine 18. In some embodiments, EGR flowpath 40 may divert a portion of the exhaust gases from exhaust system 20 from a location downstream from one or both of after-treatment devices 28, as shown in FIG. 1. It should be noted that FIG. 1 is not intended to accurately represent the relative sizes and proportions of machine 10 or the components of EGR system 38. For example, catalyst-based device 30 and/or particulate trap 34 may be located substantially closer to engine 18 than illustrated in FIG. 1.

In some embodiments, EGR flowpath 40 may divert a portion of the exhaust gases from exhaust system 20 from a location upstream from one or both of after-treatment devices 28. However, it should be noted that it may be advantageous to divert the exhaust gases from exhaust system 20 from a location downstream from after-treatment devices 28, because such gases will be cleaner than untreated gases upstream from after-treatment devices 28 and will thus have less potential to damage or otherwise cause problems with various components of the EGR system 38 (e.g., an EGR cooler; not shown), various components of the air intake system of engine 18 (e.g., turbochargers, superchargers, aftercoolers, intercoolers, air intake filters, etc.), and/or various other components of engine 18 (e.g., engine internals).

EGR system 38 may also include an exhaust gas recirculation valve (EGR valve) 44 configured to regulate the flow of exhaust gases through EGR flowpath 40. EGR valve 44 may be any type of valve configured to open or close off EGR flowpath 40, such that the position of EGR valve 44 (valve position) determines the flowrate through EGR flowpath 40 (EGR flowrate). In some embodiments, EGR valve 44 may include a flapper valve (e.g., a throttle-type butterfly valve). In some embodiments, EGR valve 44 may be operated via servo control or any suitable actuation mechanism.

Other factors, such as, for example, engine speed, turbo boost pressure, etc. may influence the EGR flowrate as well. EGR system 38 may be configured to control EGR flowrate despite these other influential factors. For example, EGR system 38 may include an exhaust gas recirculation flow detection device (EGR flow detection device) 46 configured to determine EGR flowrate. During operation, EGR valve 44 may be controlled based on measurements of EGR flowrate taken by flow detection device 46.

Flow detection device 46 may include any type of device configured to measure the flow of gases in EGR flowpath 40. For example, flow detection device 46 may include a mass flow sensor, or other such detection device.

The operation of EGR valve 44 may be controlled by controller 22. In some embodiments, controller 22 may be configured to control EGR valve 44 using open-loop control when flow detection device 46 determines that the EGR flowrate is below a predetermined flowrate and using closed-loop control when flow detection device 46 determines that the EGR flowrate is at or above the predetermined flowrate. Further, controller 22 may be configured to control the flowrate of exhaust gas recirculation, while the exhaust gas recirculation flowrate is below the predetermined flowrate; based on flowrate versus valve position data acquired during prior operation of EGR system 38 at EGR flowrates at or above the predetermined flowrate.

Controller 22 may be configured to determine the valve position, while the EGR flowrate is below the predetermined flowrate, by extrapolating from the flowrate versus valve position data acquired during prior operation of EGR system 38 at EGR flowrates at or above the predetermined flowrate. In some embodiments, the extrapolating may involve retrieving a valve position setting from a lookup table. Such a lookup table may be stored in controller 22 or some other memory included in, or otherwise associated with EGR system 38. In other embodiments, the extrapolating may involve performing a regression to a line fit. Alternatively or additionally, various other modeling and/or data processing techniques may be utilized to determine the valve position while the EGR flowrate is below the predetermined flowrate.

In some embodiments, while the EGR flowrate is at or above the predetermined flowrate, controller 22 may be configured to also use, in addition to close-loop feedback from current operation of EGR system 38, a feed forward based on flowrate versus valve position data acquired during prior operation of EGR system 38.

INDUSTRIAL APPLICABILITY

The disclosed EGR system 38 may be suitable to enhance exhaust emissions control for engines. EGR system 38 may be used for any application of an engine. Such applications may include supplying power for machines, such as, for example, stationary equipment such as power generation sets, or mobile equipment, such as vehicles. EGR system 38 may be used for any kind of vehicle, such as, for example, automobiles, construction machines (including those for on-road, as well as off-road use), and other heavy equipment.

Not only may the EGR system 38 be applicable to various applications of an engine, but EGR system 38 may be applicable to various types of engines as well. For example, EGR system 38 may be applicable to any exhaust producing engine, which may include gasoline engines, diesel engines, gaseous-fuel driven engines, hydrogen engines, etc. EGR system 38 may also be applicable to a variety of engine configurations, including various cylinder configurations, such as "V" cylinder configurations (e.g., V6, V8 l V12, etc.), inline cylinder configurations, and horizontally opposed cylinder configurations. EGR system 38 may also be applicable to engines with a variety of induction types. For example, EGR system 38 may be applicable to normally aspirated engines, as well as those with forced induction (e.g., turbocharging or supercharging). Engines to which EGR system 38 may be applicable may include combinations of these configurations (e.g., a turbocharged, inline-6 cylinder, diesel engine).

The disclosed system may be configured to utilize a control strategy for operation of an EGR valve. The control strategy may employ closed loop control of the EGR valve position, based on EGR flow measurements taken by, for example, a mass flow sensor. However, measurements of mass flow at low flow rates can be less accurate than at high flow rates. Therefore, at low flow rates, the control strategy may employ an open loop control of the EGR valve. That is, the disclosed system may utilize control strategies that employ open loop control at low EGR flow rates and closed loop control at high EGR flow rates.

The control strategy may involve data capture of EGR valve position vs. flow rate during closed loop control (i.e., at higher flow rates when the EGR valve is more open). This captured data may be used to estimate EGR flow rates when the EGR valve is more closed. Various forms of data analysis may be utilized to generally extrapolate the relationship between EGR valve position and flow rate when the valve is more closed, from the data acquired about the relationship between EGR valve position and flow rate when the valve is more open. Exemplary data processing that may be used to make such an estimation/extrapolation may include storage of the captured data in a lookup table or regression to a line fit. For example, line fit coefficients and/or offsets may be utilized to calculate flow rate from a known valve position.

As an additional feature, the closed loop aspect of the control strategy may be tuned to utilize the open loop aspect of the control strategy as a feed forward. That is, the EGR valve position may be controlled during closed loop operation based, not only on mass flow rate sensor measurements, but also on EGR valve position vs. flow rate data captured during prior closed loop operation.

The following is a description of an exemplary method for exhaust gas recirculation. The method may include routing a portion of exhaust gases produced by an engine back to an air intake of the engine via an exhaust gas recirculation flowpath. The method may also include regulating the flow of exhaust gases through the exhaust gas recirculation flowpath with an exhaust gas recirculation valve. The method may further include determining the flowrate of exhaust gases through the exhaust gas recirculation flowpath with a flow detection device and controlling the exhaust gas recirculation valve with a controller. In addition, the method may include controlling the exhaust gas recirculation valve using open-loop control when the flow detection device determines that the exhaust gas recirculation flowrate is below a predetermined flowrate and using closed-loop control when the detection device determines that the exhaust gas recirculation flowrate is at or above the predetermined flowrate.

In some embodiments, the method may include controlling the flowrate of exhaust gas recirculation, while the exhaust gas recirculation flowrate is below the predetermined flowrate, based on flowrate versus valve position data acquired during prior operation of the system at flowrates at or above the predetermined flowrate. In some embodiments, valve position may be determined, while the exhaust gas recirculation flowrate is below the predetermined flowrate, by extrapolating from the flowrate versus valve position data acquired during prior operation of the system at flowrates at or above the predetermined flowrate. In some embodiments, the extrapolating may involve retrieving a valve position setting from a lookup table. In other embodiments, the extrapolating involves performing a regression to a line fit.

In some embodiments, the method may also include using, while the exhaust gas recirculation flowrate is at or above the predetermined flowrate, a feed forward based on flowrate versus valve position data acquired during prior operation of the system.

It will be apparent to those having ordinary skill in the art that various modifications and variations can be made to the disclosed exhaust gas recirculation system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. An exhaust gas recirculation system, comprising:
an exhaust gas recirculation flowpath configured to route a portion of exhaust gases produced by an engine back to an air intake of the engine;
an exhaust gas recirculation valve configured to regulate the flow of exhaust gases through the exhaust gas recirculation flowpath;
a flow detection device configured to determine the flowrate of exhaust gases through the exhaust gas recirculation flowpath; and
a controller configured to control the exhaust gas recirculation valve;
wherein the controller is configured to control the exhaust gas recirculation valve using open-loop control when the flow detection device determines that the exhaust gas recirculation flowrate is below a predetermined flowrate and using closed-loop control when the detection device determines that the exhaust gas recirculation flowrate is at or above the predetermined flowrate.

2. The system of claim 1, wherein the controller is configured to control the flowrate of exhaust gas recirculation, while the exhaust gas recirculation flowrate is below the predetermined flowrate, based on flowrate versus valve position data acquired during prior operation of the system at flowrates at or above the predetermined flowrate.

3. The system of claim 2, wherein the controller is configured to determine the valve position, while the exhaust gas recirculation flowrate is below the predetermined flowrate, by extrapolating from the flowrate versus valve position data acquired during prior operation of the system at flowrates at or above the predetermined flowrate.

4. The system of claim 3, wherein the extrapolating involves retrieving a valve position setting from a lookup table.

5. The system of claim 3, wherein the extrapolating involves performing a regression to a line fit.

6. The system of claim 1, wherein the controller is configured to also use, while the exhaust gas recirculation flowrate is at or above the predetermined flowrate, a feed forward based on flowrate versus valve position data acquired during prior operation of the system.

7. The system of claim 1, wherein the engine includes an exhaust system configured to route exhaust gases produced by the engine away from the engine and including at least one after-treatment device; and
wherein the exhaust gas recirculation flowpath diverts a portion of the exhaust gases from the exhaust system from a location downstream from the at least one after-treatment device.

8. A method for exhaust gas recirculation, comprising:
routing a portion of exhaust gases produced by an engine back to an air intake of the engine via an exhaust gas recirculation flowpath;
regulating the flow of exhaust gases through the exhaust gas recirculation flowpath with an exhaust gas recirculation valve;
determining the flowrate of exhaust gases through the exhaust gas recirculation flowpath with a flow detection device; and
controlling the exhaust gas recirculation valve with a controller; and
controlling the exhaust gas recirculation valve using open-loop control when the flow detection device determines that the exhaust gas recirculation flowrate is below a predetermined flowrate and using closed-loop control when the detection device determines that the exhaust gas recirculation flowrate is at or above the predetermined flowrate.

9. The method of claim 8, further including controlling the flowrate of exhaust gas recirculation, while the exhaust gas recirculation flowrate is below the predetermined flowrate, based on flowrate versus valve position data acquired during prior operation of the system at flowrates at or above the predetermined flowrate.

10. The method of claim 9, wherein the controller is configured to determine the valve position, while the exhaust gas recirculation flowrate is below the predetermined flowrate, by extrapolating from the flowrate versus valve position data acquired during prior operation of the system at flowrates at or above the predetermined flowrate.

11. The method of claim 10, wherein the extrapolating involves retrieving a valve position setting from a lookup table.

12. The method of claim 10, wherein the extrapolating involves performing a regression to a line fit.

13. The method of claim 8, further including using, while the exhaust gas recirculation flowrate is at or above the predetermined flowrate, a feed forward based on flowrate versus valve position data acquired during prior operation of the system.

14. A machine, comprising:
a frame;
an engine attached to the frame;
an exhaust system configured to route exhaust gases produced by the engine away from the engine; and
an exhaust gas recirculation system, comprising:
an exhaust gas recirculation flowpath configured to route a portion of exhaust gases produced by an engine back to an air intake of the engine;
an exhaust gas recirculation valve configured to regulate the flow of exhaust gases through the exhaust gas recirculation flowpath;
a flow detection device configured to determine the flowrate of exhaust gases through the exhaust gas recirculation flowpath; and
a controller configured to control the exhaust gas recirculation valve;
wherein the controller is configured to control the exhaust gas recirculation valve using open-loop control when the flow detection device determines that the exhaust gas recirculation flowrate is below a predetermined flowrate and using closed-loop control when the detection device determines that the exhaust gas recirculation flowrate is at or above the predetermined flowrate.

15. The machine of claim 14, wherein the controller is configured to control the flowrate of exhaust gas recirculation, while the exhaust gas recirculation flowrate is below the predetermined flowrate, based on flowrate versus valve position data acquired during prior operation of the system at flowrates at or above the predetermined flowrate.

16. The machine of claim 15, wherein the controller is configured to determine the valve position, while the exhaust gas recirculation flowrate is below the predetermined flowrate, by extrapolating from the flowrate versus valve position data acquired during prior operation of the system at flowrates at or above the predetermined flowrate.

17. The machine of claim 16, wherein the extrapolating involves retrieving a valve position setting from a lookup table.

18. The machine of claim 16, wherein the extrapolating involves performing a regression to a line fit.

19. The machine of claim 14, wherein the controller is configured to also use, while the exhaust gas recirculation flowrate is at or above the predetermined flowrate, a feed forward based on flowrate versus valve position data acquired during prior operation of the system.

20. The machine of claim 14, wherein the exhaust system includes at least one after-treatment device; and wherein the exhaust gas recirculation flowpath diverts a portion of the exhaust gases from the exhaust system from a location downstream from the at least one after-treatment device.

* * * * *